United States Patent

[11] 3,581,686

| [72] | Inventor | Richard L. Raymond<br>Wilmington, Del. |
|---|---|---|
| [21] | Appl. No. | 771,620 |
| [22] | Filed | Oct. 29, 1968 |
| [45] | Patented | June 1, 1971 |
| [73] | Assignee | Sun Oil Company<br>Philadelphia, Pa.<br>Continuation-in-part of application Ser. No. 714,169, Mar. 15, 1968. |

[54] METHOD FOR CONTROLLING NEMATODES
7 Claims, No Drawings

[52] U.S. Cl. .................................................. 111/1;
47/57.6, 424/355, 424/356
[51] Int. Cl. ..................................................... A01a 7/04,
A01n 9/00, A01n 21/00
[50] Field of Search ........................................ 424/355,
356; 99/3
111/1

[56] References Cited
UNITED STATES PATENTS
3,356,567  12/1967  Goonewardene ............ 424/346
OTHER REFERENCES
Clarke, Chemistry and Industry, 2/26/66 pp. 363, 364—366 Clarke et al, Nematologica 10 (1964) ppl 431— 453

*Primary Examiner*—Albert T. Meyers
*Assistant Examiner*—Norman A. Drezin
*Attorneys*—George L. Church, Donald R. Johnson, Wilmer E. McCorquodale, Jr. and Warren L. Soffian

ABSTRACT: This invention relates to the use of hydrocarbon compounds as hatching agents for nematodes, and their subsequent use in conjunction with nematocides, when applied either directly or in pelletized form, for the extermination of nematodes.

METHOD FOR CONTROLLING NEMATODES

This application is a continuation-in-part of application Ser. No. 714,169 filed Mar. 15, 1968.

This invention relates to hydrocarbon hatching agents for nematodes and to the use of the hatching agents in the extermination of nematodes.

Nematodes are a class of worms of the phylum Nemathelminthes roundworms or threadworms. Nematodes are also known as eelworms. They customarily inhabit soil and feed upon the roots of plants growing therein. Included in the class are the cystforming nematodes of the genus Heterodera, the stubby root nematodes of the genus Trichodorus, the bulb and stem nematodes of the genus Ditylenchus, the golden nematode, Heterodera rostochiensis, the root knot nematodes, of the genus Meloidogyne, the root lesion nematodes of the genus Pratylenchus, the citrus nematodes of the genus Tylenchulus, the sting nematodes of the genus Belonalaimus, and the plant-parasitic nematodes of genera such as Naccobus, Radopholus, and others.

Nematodes damage root structure and alter the proper development of plants growing in infested soil. The damage is generally manifested by the growth of galls, root knots, and other abnormalities. Gall formation reduces the size and effectiveness of the root system and also seriously affects other plant parts so that the weakened plant becomes subject to attacks by other diseasing agents. Unless treated, the plant dies.

As such, a great deal of work has been carried out in attempts to find effective nematocides. Recently, however, experimenters have focused their studies on the securement of adequate hatching agents for nematodes. The purpose of such studies is pointed not only towards the possibility of observing the nematodes during hatching, but also for extermination. The reason for this apparent anomaly is the observation that nematocides have proven to be more effective in killing larvae outside the cyst or egg.

Two recent publications which have delved into synthetic hatching agents are: Clark, A. J., and Shepherd, A. M., *Synthetic Hatching Agents for Heterodera Schachtii Schm. and their Mode of Action*, Nematologica 10, 1964, pp. 431—453; and Clark, A. J., *Hatching Agents for Cyst-Forming Nematodes*, Chemistry and Industry, Feb. 26, 1966, pp. 363—366. These articles compare their artificial hatching agents with root diffusates from host plants which have been known to stimulate larvae to hatch from eggs. As pointed out in these articles, artificial hatching agents have proven to be less effective than the natural factors.

In accordance with the invention, it has been discovered that several hydrocarbon compounds are effective as hatching agents for nematodes when present in soil in a concentration in the range of 1 to 100 parts per million parts of soil on a weight basis. The operable compounds include acenaphthylene, anthracene, indene, and their mono-alkyl substituted derivatives wherein the alkyl is either a methyl or ethyl radical, and $\alpha$-olefins having from 5 to 20 carbon atoms, and mixtures thereof. The mono-alkyl substituted derivatives comprise methylacenaphthylene, ethyl-acenaphthylene, methylanthracene, ethylanthracene, methylindene, and ethylindene wherein the preferred derivatives are those substituted in the $\alpha$-position. Examples of such $\alpha$-olefins include octene-1, decene-1, dodecene-1, octadecene-1, etc., with octadecene-1 being the preferred hatching agent.

The term "soil" in this specification is used to include any medium capable of supporting the growth of plants and therefore includes common soil, humus, manure, compost, sand, and the like, and also artificially created plant growth media.

The hatching agent can be placed in the soil by any method well known in the art, but preferably it is mixed with or placed on a dry carrier and then situated in the soil. Various well-known carriers such as Attapulgus clay, talc, diatomaceous earth, Fuller's earth, bentonite, chalk, mica, clay, and the like, may be employed advantageously. The supported hatching agent is sprinkled on the soil and then plowed therein by a rototiller or discs to at least 4 to 6 inches below the surface.

In a process for exterminating nematodes, a hatching agent of this invention is mixed with infested soil at an operable concentration, as previously disclosed, in the top 4 to 6 inches of the soil. In conjunction with the application of the hatching agent, or preferably, approximately two to three weeks later, a nematocide such as 1-methyl naphthalene, naphthalene, biphenyl, acenaphthene, or any other nematocide well known in the art is applied to the soil.

As a specific embodiment of the instant invention, acenaphthylene is mixed on a hot mill with Attapulgus clay so that the concentration on the clay does not exceed 20 percent by weight. The supported acenaphthylene is then mixed with a quantity of common soil, at a concentration of approximately 100 ppm. Ten days after application of the acenaphthylene, a total nematode count was taken, and the soil contained approximately 1,988 nematodes per half pint of soil, while control plots had approximately 768 nematodes per half pint of soil.

Similar tests were carried out with the other applicable compounds. The results are shown in Table I. It should be noted that anthracene has a partial phytotoxic effect.

TABLE I

| Hydrocarbon | Concentration, p.p.m. | Total nematodes per ½ pint soil | Phytotoxicity, 10 days after application (percent kill) |
|---|---|---|---|
| Acenaphthylene | 100 | 1,988 | 0 |
| Acenaphthene | 100 | 156 | 100 |
| Octadecene-1 | 100 | 1,480 | 0 |
| Anthracene | 100 | 1,352 | 45 |
| Indene | 100 | 1,128 | 0 |
| 1-methylnaphthalene | 100 | 8 | 100 |
| Biphenyl | 100 | 12 | 100 |
| Control | 0 | 768 | 0 |

The nematodes were counted using a modified Baermann funnel technique. One-half pint aliquots of soil were mixed with approximately one gallon of water, permitted to settle 30 to 60 seconds, and poured through 20 and 325 mesh screens respectively. After washing with a gentle stream of water, the collected material was transferred to a funnel containing tissue paper supported on a metal screen. After settling overnight, the nematodes were drawn into a counting dish for enumeration.

As a second and preferred embodiment of this invention is the use of a pellet carrying out the functions of both a hatching agent and a nematocide. Specifically, pellets comprising centralized portions of biphenyl, naphthalene, or any other well-known nematocide are formed and are then covered with a biodegradable wax, having mixed therein 10 to 20 percent by weight of a hatching agent of this invention. A pellet of this fashion will first begin to function as a hatching agent, and upon degradation the nematocide will tend to exterminate those nematodes hatched. Any biodegradable wax well known in the art can be used in forming the pellets; however, the preferred wax is a solid paraffin wax. The term paraffin wax as used herein is to be distinguished from certain other types of waxes. By conventional definition and as used herein, paraffin wax refers to a certain type of wax obtained from petroleum. Consequently, the term does not include other natural waxes such as beeswax and carnauba wax. Petroleum yields two types of waxes, paraffin, containing mainly straight chain paraffins, and microcrystalline, containing a substantial amount of branch chain paraffins. Although both are operable, the straight chain is preferable due to its faster degradation.

A particular advantage of the preferred embodiment of the instant invention is its ease of applicability. The pellets can merely be rototilled into the soil after application with a fertilizer spreader. Again, a preferable depth is from the surface to 4 to 6 inches below the surface of the of the soil.

It is generally considered that one acre of average soil to a cultivatable 6-inch depth will weigh about two million pounds. On this basis, a range of approximately 2 to 200 pounds of hatching agent when applied directly to the soil will fall within the operable range of the invention.

While the particular compositions and methods of application described herein are well adapted to meet the objects of the present invention, various modifications or changes may be resorted to without departing from the scope of the invention as defined in the claims.

I claim:
1. A method for controlling nematodes in soil comprising the steps of
   a. applying to the soil a nematode hatching agent selected from the group consisting of acenaphthylene, anthracene, indene, mixtures thereof,
   their mono-alkyl substituted derivatives wherein said alkyl is selected from the group consisting of methyl and ethyl radicals, and $\alpha$-olefins having from 5 20 carbon atoms,
   b. tilling the hatching agent into the soil, and
   c. Applying to the soil, a nematocidally effective amount of a nematocide, wherein said hatching agent is present on a weight basis in the range of 1 to 100 parts hatching agent per million parts of soil.
2. A method for controlling nematodes in soil as recited in claim 1 wherein the hatching agent is first mixed with a dry carrier before being applied to the soil.
3. A method for controlling nematodes in soil as recited in claim 1 wherein the hatching agent is selected from the group consisting of acenaphthylene, anthracene, indene, octadecene-1, and mixtures thereof.
4. A method for controlling nematodes in soil as recited in claim 1 wherein the hatching agent is acenaphthylene.
5. A method for controlling nematodes in soil as recited in claim 1 wherein the hatching agent is indene.
6. A method for controlling nematodes in soil as recited in claim 1 wherein the hatching agent is octadecene-1.
7. A method for controlling nematodes in soil as recited in claim 1 wherein the hatching agent is anthracene.